United States Patent [19]

Nakamura et al.

[11] Patent Number: 5,531,345
[45] Date of Patent: Jul. 2, 1996

[54] FITTING CONSTRUCTION OF ELECTRICAL CONNECTION BOX

[75] Inventors: Masayoshi Nakamura; Hiroki Ikeda, both of Yokkaichi, Japan

[73] Assignee: Sumitomo Wiring Systems, Ltd., Yokkaichi, Japan

[21] Appl. No.: 297,788

[22] Filed: Aug. 30, 1994

[30] Foreign Application Priority Data

Oct. 12, 1993 [JP] Japan ................. 5-055048 U

[51] Int. Cl.⁶ ........................................ H02G 3/08
[52] U.S. Cl. ..................... 220/3.8; 220/326; 220/4.21
[58] Field of Search ........................ 220/3.8, 4.21, 220/324, 326, 355, 677, 691, 692; 174/50

[56] References Cited

U.S. PATENT DOCUMENTS

| | | | |
|---|---|---|---|
| 2,720,332 | 10/1955 | Holt | 220/691 X |
| 3,840,152 | 10/1974 | Hodge | 220/326 X |
| 4,209,107 | 6/1980 | Crisci | 220/355 X |
| 4,349,119 | 9/1982 | Letica . | |
| 4,368,819 | 1/1983 | Durham | 220/255 X |
| 4,574,974 | 3/1986 | Von Holdt . | |
| 4,792,055 | 12/1988 | Schupack et al. | 220/324 X |
| 4,896,784 | 1/1990 | Heath . | |
| 5,050,764 | 9/1991 | Voss | 220/378 |
| 5,186,661 | 2/1993 | Capper . | |

*Primary Examiner*—Stephen K. Cronin
*Attorney, Agent, or Firm*—Greenblum & Bernstein

[57] ABSTRACT

A fitting construction of an electrical connection box, comprising: a casing member which is made of resin and is formed, at an upper end of its peripheral wall, with a projection; and a cover member which is made of resin and is formed, on a lower face of its peripheral wall, with a downwardly opening fitting groove so as to be mounted on an upper portion of the casing member through fitting of the projection into the fitting groove; wherein the fitting groove is shaped so as to become wider towards a lower end of the fitting groove, while the projection is shaped so as to become wider towards a lower end of the projection; wherein the projection is brought into pressing contact with opposed side faces of the fitting groove at the time of fitting of the projection into the fitting groove so as to spread out the fitting groove.

6 Claims, 3 Drawing Sheets

FITTING CONSTRUCTION OF ELECTRICAL CONNECTION BOX

BACKGROUND OF THE INVENTION

The present invention generally relates to an electrical connection box which contains electrical connection components such as a blade fuse, a slow blowing fuse, a relay, etc. so as to supply electric current to a portion of a wiring provided in a motor vehicle and more particularly, to a fitting construction of the electrical connection box, which includes a casing member made of resin and a cover member made of resin and mounted on the casing member, the cover member being formed, on a lower surface of its peripheral wall, with a downwardly opening fitting groove, while the casing member is formed, at an upper end of its peripheral wall, with a projection such that the projection is fitted into the fitting groove.

With reference to FIG. 1 showing an electrical connection box of the present invention, a general electrical connection box is briefly described. The electrical connection box includes a casing member 1 made of resin and acting as a lower casing and a cover member 2 for preventing entry of water into the casing member 1, which is made of resin and is mounted on the casing member 1 so as to cover an upper opening of the casing member 1. A fitting portion 5 formed at an upper end of a peripheral wall of the casing member 1 is fitted into a fitting portion 6 formed on a lower surface of the cover member 2 such that the casing member 1 and the cover member 2 are locked to each other through engagement between upper locking portions 7 of the cover member 2 and lower locking portions 8 of the casing member 1, respectively.

FIG. 5 shows a fitting construction of a known electrical connection box. In FIG. 5, a downwardly opening fitting groove 10 is formed at the fitting portion 6 of the cover member 2. In order to impart hermetic property to the cover member 2, a rubber packing 11 is fitted into the fitting groove 10. Meanwhile, a projection 13 of a cross-sectional shape having a thin distal end is formed on the fitting portion 5 of the casing member 1. By pressing an upper end face of the projection 13 against the packing 11 at the time of fitting of the fitting portion 5 of the casing member 1 into the fitting portion 6 of the cover member 2, mounting feeling and waterproof property of the cover member 2 are secured.

In the known electrical connection box of this kind, since the rubber packing 11 is provided, the number of components of the known electrical connection box and assembly steps of the known electrical connection box are increased, thereby resulting in rise of its production cost. On the other hand, if the packing 11 is merely eliminated, hermetic property and waterproof property of the electrical connection box are deteriorated.

SUMMARY OF THE INVENTION

Accordingly, an essential object of the present invention is to provide a fitting construction of an electrical connection box, in which a packing is eliminated from a fitting portion so as to reduce the number of components and lower its production cost while hermetic property, waterproof property and assembly accuracy are secured.

In order to accomplish this object of the present invention, a fitting construction of an electrical connection box, according to the present invention comprises: a casing member which is made of resin and is formed, at an upper end of its peripheral wall, with a projection; and a cover member which is made of resin and is formed, on a lower face of its peripheral wall, with a downwardly opening fitting groove so as to be mounted on an upper portion of the casing member through fitting of the projection into the fitting groove; wherein the fitting groove is shaped so as to become wider towards a lower end of the fitting groove, while the projection is shaped so as to become wider towards a lower end of the projection; wherein the projection is brought into pressing contact with opposed side faces of the fitting groove at the time of fitting of the projection into the fitting groove so as to spread out the fitting groove.

When the cover member is mounted on the casing member, the projection of the casing member is fitted into the fitting groove of the cover member and the cover member is locked to the casing member by locking portions such that the projection is brought into pressing contact with the side face of the fitting groove.

Since the fitting groove is formed so as to become wider towards its lower end and the projection is also formed so as to become wider towards its lower end, the fitting groove is deflected outwardly through pressing contact of the projection with the side faces of the fitting groove. As a result, hermetic property and waterproof property of fitting portions of the casing member and the cover member are secured.

Meanwhile, the side faces of the fitting groove which are made wider towards its lower end function as a positioning guide for the projection at the time of fitting of the projection into the fitting groove. Namely, even if the cover member or the casing member is slightly deformed at the time of resin molding or is distorted to some extent during their mounting on a vehicle body, the projection is smoothly fitted into the downwardly wider fitting groove and is securely guided towards the bottom of the fitting groove by the oblique side faces of the fitting groove so as to be brought into pressing contact with the side faces of the fitting groove.

BRIEF DESCRIPTION OF THE DRAWINGS

This object and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
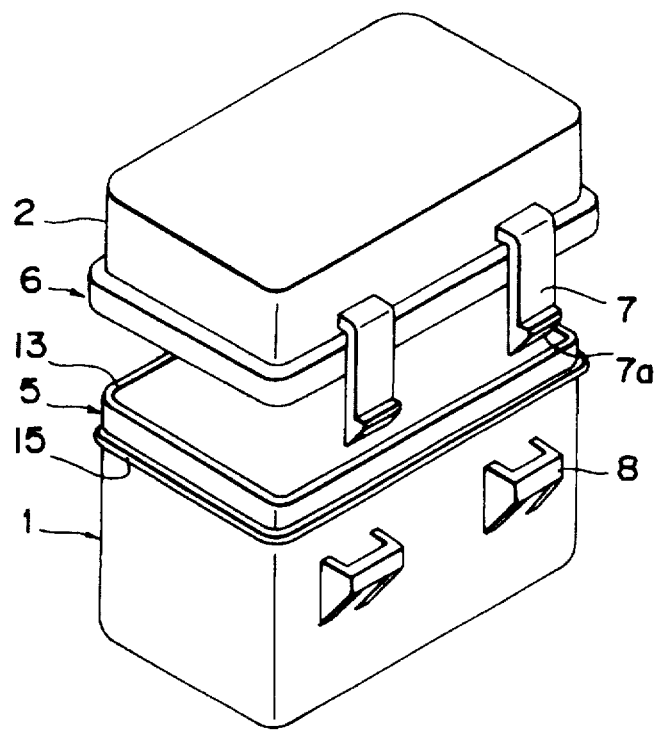
FIG. 1 is a perspective view of an electrical connection box having a fitting construction of the present invention.
Figure 2A:
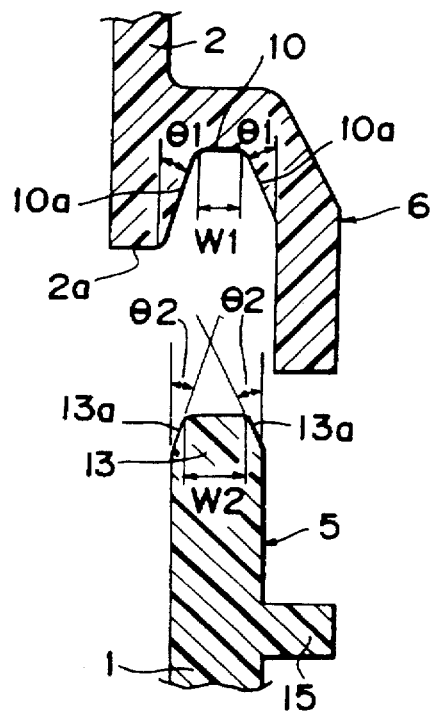
FIGS. 2A and 2B are enlarged fragmentary sectional views of a fitting construction of the electrical connection box of FIG. 1, according to a first embodiment of the present invention prior to and after mounting of a cover member on a casing member, respectively.
Figure 2B:
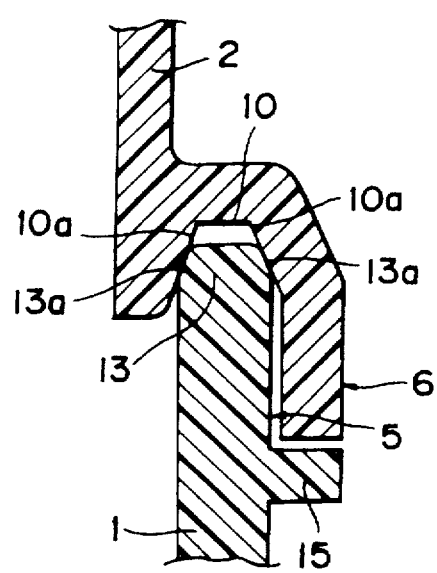

Referring now to the drawings, there is shown in FIG. 1, a rectangular electrical connection box to which a fitting construction of FIGS. 2A and 2B according to a first embodiment of the present invention is applied. The electrical connection box includes a casing member 1 made of resin and a cover member 2 which is made of resin and is mounted on the casing member 1. The casing member 1 acts as a lower casing. An outwardly extending brim 15 is formed at an upper end portion of a peripheral wall of the casing member 1 so as to wholly enclose the peripheral wall of the casing member 1. Above the brim 15, an upwardly extending projection 13 is formed as a fitting portion 5 along a whole of the peripheral wall of the casing member 1. An upper casing (not shown) is fitted into the casing member 1 and electrical connection components such as a fuse and a relay are mounted in the casing member 1.

Each of two upper locking portions 7 formed on each of opposite side faces of a peripheral wall of the cover member 2 extends like an arm downwardly from the cover member 2. An engageable wedge shaped boss 7a is formed integrally with a lower end of the upper locking portion 7. On the other hand, each of two lower locking portions 8 formed on each of opposite side faces of the peripheral wall of the casing member 1 is formed into an upwardly opening boxlike shape. When the upper locking portion 7 is fitted into the lower locking portion 8, the boss 7a is brought into engagement with the lower locking portion 8 so as to lock the cover member 2 to the casing member 1.

As shown in FIG. 2A, a fitting portion 6 of the cover member 2 not only extends outwardly from the peripheral wall of the cover member 2 but is bent downwardly in a substantially L-shaped form. This bent portion of the fitting portion 6 extends downwardly beyond a lower end face 2a of the cover member 2. By this arrangement of the fitting portion 6, a downwardly opening fitting groove 10 is formed at the fitting portion 6. Opposed side faces 10a of the fitting groove 10 are inclined flat such that distance between the side faces 10a of the fitting groove 10 is increased gradually towards a lower end of the fitting 10 portion 6. In this embodiment, the side faces 10a have an identical angle θ1 of inclination relative to a vertical. Namely, cross section of the fitting groove 10 is formed into a symmetric trapezoidal shape.

On the other hand, opposite side faces 13a of the projection 13 are inclined flat so as to come closer to each other towards an upper end of the projection 13 and have an identical angle θ2 of inclination relative to the vertical. Namely, cross section of the projection 13 is formed so as to have a symmetric thin distal end.

The side faces 10a and 13a are formed flat. Furthermore, the angle θ1 of inclination of the side faces 10a and the angle θ2 of inclination of the side faces 13a are set at a substantially identical value. In view of the fact that the fitting groove 10 is slightly spread out by the projection 13 at the time of mounting of the cover member 2 on the casing member 1, it is preferable that the angle θ2 of inclination of the side faces 13a of the projection 13 is set so as to be slightly larger than the angle θ1 of inclination of the side faces 10a of the fitting groove 10.

Furthermore, a width W2 of the distal end of the projection 13 is set so as to be larger than a width W1 of a bottom of the fitting groove 10. Thus, at the time of mounting of the cover member 2 on the casing member 1, the side faces 13a of the projection 13 are brought into pressing contact with the side faces 10a of the fitting groove at all times.

Operation of the fitting construction of the present invention is described below. When the cover member 2 is mounted on the casing member 1, the projection 13 of the casing member 1 is fitted into the fitting groove 10 of the cover member 2 as shown in FIG. 2A and the upper locking portions 7 and the lower locking portions 8 shown in FIG. 1 are brought into engagement with each other. Thus, as shown in FIG. 2B, the oblique side faces 13a of the projection 13 are brought into pressing contact with the oblique side faces 10a of the fitting groove 10.

Since the fitting groove 10 is formed so as to become wider towards the lower end of the fitting portion 6 and the projection 13 is also formed so as to become thinner towards the upper end of the projection 13, the fitting groove 10 is slightly deflected outwardly through pressing contact of the side faces 13a with the side faces 10a and thus, hermetic property and waterproof property at the fitting portions 5 and 6 are secured.

Meanwhile, since the side faces 10a of the fitting groove 10 are inclined, the side faces 10a function as a positioning guide for the projection 13 at the time of fitting of the projection 13 into the fitting groove 10. Namely, even if the cover member 2 or the casing member 1 is slightly deformed at the time of resin molding or is distorted to some extent during their mounting on a vehicle body, the projection 13 having the thin distal end is smoothly fitted into the downwardly wider fitting groove 10 and is securely guided towards the bottom of the fitting groove 10 by the oblique side faces 10a so as to be brought into pressing contact with the side faces 10a.

Figure 3:
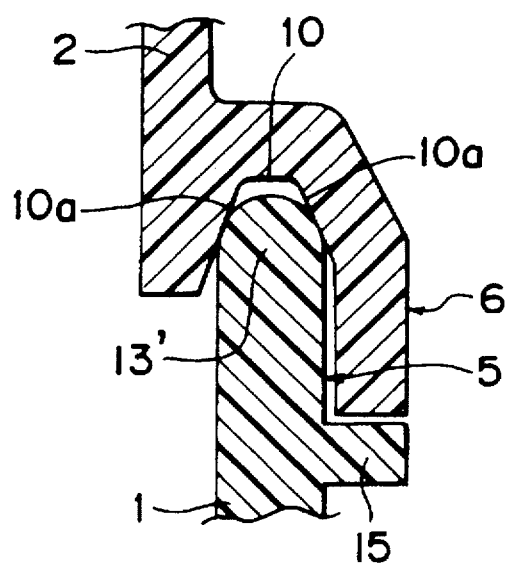
FIG. 3 is a view similar to FIG. 2B, particularly showing a second embodiment of the present invention.

FIG. 3 shows a second embodiment of the present invention. In FIG. 3, the side faces 10a of the fitting groove 10 are inclined flat as in the first embodiment of FIGS. 2A and 2B. However, a distal end of a projection 13' has a semicircular cross-sectional shape.

By this arrangement of FIG. 3, any one of points on the semicircular surface of the distal end of the projection 13' is positively brought into pressing contact with the oblique side faces 10a of the fitting groove 10 regardless of degree of spread of the fitting groove 10.

Figure 4:
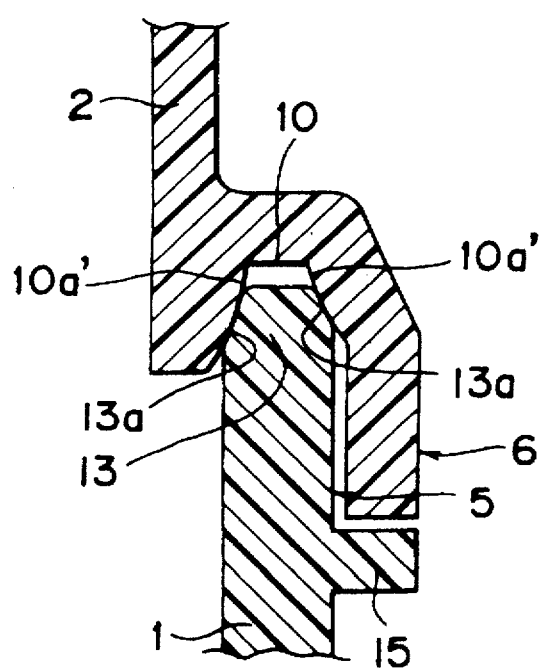
FIG. 4 is a view similar to FIG. 2B, particularly showing a third embodiment of the present invention.
Figure 5:
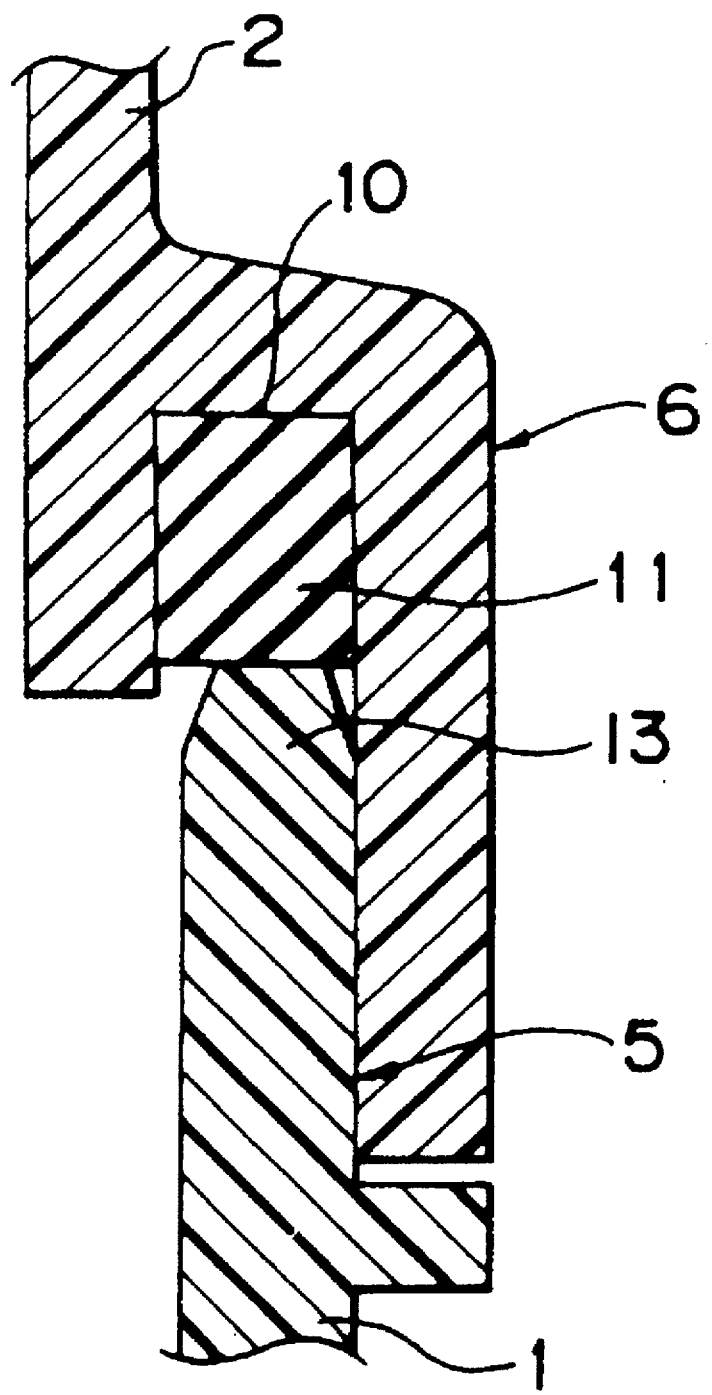
FIG. 5 is a sectional view of a fitting construction of a prior art electrical connection box (already referred to).

FIG. 4 shows a third embodiment of the present invention. In FIG. 4, the side faces 13a of the projection 13 are inclined flat as in the first embodiment of FIGS. 2A and 2B. However, opposed side faces 10a' of the fitting groove 10 are inclined arcuately so as to bulge towards each other.

Also by this arrangement of FIG. 4, the side faces 13a of the projection 13 are positively brought into pressing contact with the arcuate side faces 10a' of the fitting groove 10 regardless of degree of spread of the fitting groove 10 in the same manner as the second embodiment.

Furthermore, by forming the oblique side faces 10a of the fitting groove 10 concavely, the oblique side faces 13a of the projection 13 may be formed arcuately so as to bulge outwardly.

As is clear from the foregoing description of the fitting construction of the electrical connection box, the following effects (1) and (2) can be achieved.

(1) Since the fitting groove 10 of the cover member 2 is formed so as to become wider towards the lower end of the fitting groove 10 and the projection 13 of the casing member 1 is formed so as to become thinner towards the distal end of the projection 13, the projection 13 is brought into pressing contact with the fitting groove 10 when the projection 13 is fitted into the fitting groove Therefore, while the number of components of the electrical connection box is reduced and production cost of the electrical connection box is lowered by eliminating a packing from the fitting portions 5 and 6, hermetic property, waterproof property and assembly accuracy of the electrical connection box can be secured.

(2) Since the fitting groove 10 is formed so as to become wider towards the lower end of the fitting groove 10, the side faces 10a of the fitting groove 10 act as a positioning guide for the projection 13 when the projection 13 is fitted into the fitting groove 10. Therefore, even if the cover member 2 or the casing member 1 is slightly deformed at the time of resin molding or is distorted to some extent during their mounting on a vehicle body, the projection 13 can be fitted into the fitting groove 10 easily and positively.

What is claimed is:

1. A fitting construction of an electrical connection box, comprising:

a casing member which is made of resin and includes a first peripheral wall having an upper end, a projection being formed at the upper end of the first peripheral wall; and a cover member which is made of resin and includes a second peripheral wall having a lower face, a downwardly opening fitting groove being formed on the lower face of the second peripheral wall so as to be mounted on an upper portion of the casing member through fitting of the projection into the fitting grove;

wherein the fitting grove is shaped so as to become wider towards a lower end of the fitting groove, while the projection is shaped so as to become wider towards a lower end of the projection;

a locking member for locking the cover member and the casing member together, the locking member being formed separately from both the projection and the fitting groove;

wherein the projection is brought into pressing contact with opposed side faces of the fitting groove at the time of fitting of the projection into the fitting groove so as to spread out the fitting groove and said projection includes a top portion which provides sealing engagement at a point spaced from the peripheral wall of the casing member when said cover member is locked by said locking member to said casing member.

2. A fitting construction as claimed in claim 1, wherein the side faces of the fitting groove are inclined flat and opposite side faces of the projection are inclined flat.

3. A fitting construction as claimed in claim 1, wherein the side faces of the fitting groove are inclined flat and a distal end of the projection has a semicircular cross-sectional shape.

4. A fitting construction as claimed in claim 1, wherein the locking member includes a first locking portion on the casing member and a second locking portion on the cover member.

5. A fitting construction of an electrical connection box, comprising:

a casing member which is made of resin and includes a first peripheral wall having an upper end, a projection being formed at the upper end of the first peripheral wall; and a cover member which is made of resin and includes a second peripheral wall having a lower face, a downwardly opening fitting groove being formed on the lower face of the second peripheral wall so as to be mounted on an upper portion of the casing member through fitting of the projection into the fitting grove;

wherein the fitting groove is shaped so as to become wider towards a lower end of the fitting groove, while the projection is shaped so as to become wider towards a lower end of the projection;

the side faces of the fitting groove being inclined arcuately so as to bulge towards each other and opposite side faces of the projection are inclined flat;

wherein the projection is brought into pressing contact with opposed side faces of the fitting groove at the time of fitting of the projection into the fitting groove so as to spread out the fitting groove.

6. A fitting construction of an electrical connection box, comprising:

a casing member which is made of resin and includes a first peripheral wall having an upper end a projection being formed at the upper end of the first peripheral wall; and a cover member which is made of resin and includes a second peripheral wall having a lower face, a downwardly opening fitting groove being formed on the lower face of the second peripheral wall so as to be mounted on an upper portion of the casing member through fitting of the projection into the fitting grove;

wherein the fitting grove is shaped so as to become wider towards a lower end of the fitting groove, while the projection is shaped so as to become wider towards a lower end of the projection;

a locking member for locking the cover member and the casing member together, the locking member being formed separately from both the projection and the fitting groove;

wherein the side faces of the fitting groove are inclined arcuately so as to bulge towards each other and opposite side faces of the projection are inclined flat; and wherein the projection is brought into pressing contact with opposed side faces of the fitting groove at the time of fitting of the projection into the fitting groove so as to spread out the fitting groove.

* * * * *

UNITED STATES PATENT AND TRADEMARK OFFICE
CERTIFICATE OF CORRECTION

PATENT NO. : 5,531,345
DATED : July 2, 1996
INVENTOR(S) : M. NAKAMURA et al.

It is certified that error appears in the above-indentified patent and that said Letters Patent is hereby corrected as shown below:

At column 5, line 35 (claim 1, line 24), change "groove" to ---groove,---.

At column 5, line 37 (claim 1, line 26), before "peripheral" insert ---ends of the---.

At column 6, line 26 (claim 6, line 4), change "end" to ---end,---.

Signed and Sealed this

Fourth Day of February, 19!

Attest:

BRUCE LEHMAN

*Attesting Officer*     *Commissioner of Patents and Trademarks*